United States Patent
Podaima et al.

(10) Patent No.: US 10,007,619 B2
(45) Date of Patent: Jun. 26, 2018

(54) MULTI-THREADED TRANSLATION AND TRANSACTION RE-ORDERING FOR MEMORY MANAGEMENT UNITS

(71) Applicant: QUALCOMM Incorporated, San Diego, CA (US)

(72) Inventors: Jason Edward Podaima, Toronto (CA); Paul Christopher John Wiercienski, Toronto (CA); Carlos Javier Moreira, Markham (CA); Alexander Miretsky, Vaughan (CA); Meghal Varia, Brampton (CA); Kyle John Ernewein, Toronto (CA); Manokanthan Somasundaram, Markham (CA); Muhammad Umar Choudry, Markham (CA); Serag Monier Gadelrab, Markham (CA)

(73) Assignee: QUALCOMM Incorporated, San Diego, CA (US)

( * ) Notice: Subject to any disclaimer, the term of this patent is extended or adjusted under 35 U.S.C. 154(b) by 344 days.

(21) Appl. No.: 14/859,351

(22) Filed: Sep. 20, 2015

(65) Prior Publication Data
US 2016/0350234 A1 Dec. 1, 2016

Related U.S. Application Data

(60) Provisional application No. 62/168,712, filed on May 29, 2015.

(51) Int. Cl.
*G06F 12/10* (2016.01)
*G06F 12/08* (2016.01)
(Continued)

(52) U.S. Cl.
CPC ...... *G06F 12/1063* (2013.01); *G06F 12/0844* (2013.01); *G06F 12/0891* (2013.01);
(Continued)

(58) Field of Classification Search
CPC ............ G06F 12/1063; G06F 12/0891; G06F 12/0844; G06F 12/1036; G06F 12/0806;
(Continued)

(56) References Cited

U.S. PATENT DOCUMENTS 7,434,000 B1 10/2008 Barreh et al.
8,738,860 B1 5/2014 Griffin et al.
(Continued)

OTHER PUBLICATIONS

International Search Report and Written Opinion—PCT/US2016/029502—ISA/EPO—dated Jun. 23, 2016.

*Primary Examiner* — Reginald Bragdon
*Assistant Examiner* — Mehdi Namazi
(74) *Attorney, Agent, or Firm* — Muncy, Geissler, Olds & Lowe, P.C.

(57) ABSTRACT

Systems and methods relate to performing address translations in a multithreaded memory management unit (MMU). Two or more address translation requests can be received by the multithreaded MMU and processed in parallel to retrieve address translations to addresses of a system memory. If the address translations are present in a translation cache of the multithreaded MMU, the address translations can be received from the translation cache and scheduled for access of the system memory using the translated addresses. If there is a miss in the translation cache, two or more address translation requests can be scheduled in two or more translation table walks in parallel.

38 Claims, 11 Drawing Sheets

(51) Int. Cl.
*G06F 12/1045* (2016.01)
*G06F 12/0891* (2016.01)
*G06F 12/0844* (2016.01)
*G06F 12/1036* (2016.01)
*G06F 12/0806* (2016.01)
*G06F 12/0842* (2016.01)
*G06F 12/1009* (2016.01)

(52) U.S. Cl.
CPC ...... *G06F 12/1036* (2013.01); *G06F 12/0806* (2013.01); *G06F 12/0842* (2013.01); *G06F 12/1009* (2013.01); *G06F 2212/1024* (2013.01); *G06F 2212/50* (2013.01); *G06F 2212/655* (2013.01); *G06F 2212/682* (2013.01); *G06F 2212/683* (2013.01); *G06F 2212/684* (2013.01)

(58) Field of Classification Search
CPC ........... G06F 12/0842; G06F 2212/683; G06F 2212/50
See application file for complete search history.

(56) References Cited

U.S. PATENT DOCUMENTS

| | | |
|---|---|---|
| 2001/0052053 A1 | 12/2001 | Nemirovsky et al. |
| 2002/0065993 A1* | 5/2002 | Chauvel .................. G06F 1/206 711/144 |
| 2008/0256279 A1* | 10/2008 | Kethareswaran ..... G06F 13/364 710/244 |
| 2009/0119663 A1* | 5/2009 | Mukherjee .......... G06F 12/1081 718/1 |
| 2010/0106921 A1 | 4/2010 | Glasco et al. |
| 2010/0332787 A1 | 12/2010 | Grohoski et al. |
| 2012/0137075 A1 | 5/2012 | Vorbach |
| 2012/0159039 A1* | 6/2012 | Kegel ................. G06F 12/1009 711/6 |
| 2013/0339650 A1* | 12/2013 | Alexander .......... G06F 12/0862 711/205 |
| 2014/0075123 A1 | 3/2014 | Hildesheim et al. |
| 2015/0100733 A1 | 4/2015 | Basto et al. |
| 2015/0100753 A1 | 4/2015 | Shen et al. |
| 2016/0210069 A1* | 7/2016 | Lutas .................... G06F 3/0622 |
| 2017/0091116 A1* | 3/2017 | GadelRab .......... G06F 12/1072 |

\* cited by examiner

MULTI-THREADED TRANSLATION AND TRANSACTION RE-ORDERING FOR MEMORY MANAGEMENT UNITS

CLAIM OF PRIORITY UNDER 35 U.S.C. § 119

The present Application for Patent claims priority to Provisional Application No. 62/168,712 entitled "MULTI-THREADED TRANSLATION AND TRANSACTION RE-ORDERING FOR MEMORY MANAGEMENT UNITS" filed May 29, 2015, and assigned to the assignee hereof and hereby expressly incorporated by reference herein.

FIELD OF DISCLOSURE

Disclosed aspects relate to memory management units (MMUs), and more particularly, exemplary aspects relate to multithreaded MMUs configured to handle multiple translations in parallel.

BACKGROUND

A memory management unit (MMU) is configured to perform address translation (and other memory management functions) for processors or peripheral devices (generally referred to as an upstream client or device). For example, an MMU may comprise a translation lookaside buffer (TLB) as known in the art to perform virtual to physical memory address translations.

With reference to FIG. 1, a conventional MMU 104 receives a client input transaction 116 (e.g., a request to read or write an address) from upstream client device 102 and if a translation exists in MMU 104 for client input transaction 116, MMU 104 performs address translation. The address translation information is used to translate the address in the client input transaction request 116 to an address for client output transaction 120.

MMU 104 is shown in more detail in FIG. 1. MMU 104 can include translation cache 108 which stores results of previously completed (or partially completed) translations. Client input transactions 116 that cannot be translated using information stored in translation cache 108 are resolved by performing a process called a "translation table walk" using translation table walker (TTW) 114. A particular entry (shown as TTW0 112) corresponding to the particular client input transaction 116 is used to perform translation table walks for the translation request. In some cases, translation table walk requests can be sent from bus 124, through bus 120 to system memory 106, wherein, response 122 can include corresponding translation information received from system memory 106 (a downstream device) and used to populate translation cache 108. In some cases, client output transactions can be sent on bus 120, wherein, response 122 can pertain to the client output transactions and be sent to upstream client device 102.

As numerous client input transactions 116 may be received before they can be serviced in the above manner, client input transactions 116 are placed in transaction queue 110 before they can access translation cache 108. Client input transactions 116 at the head of transaction queue 110 are serially allowed to access translation cache 108. If no translation is found in translation cache 108 for client input transaction 116 at the head of transaction queue 110, all other transactions in transaction queue 110 are forced to wait until a translation result for client input transaction 116 at the head of transaction queue 110 is obtained from the translation table walk process using TTW 114 and access of system memory 106. During the time that the translation for client input transaction 116 at the head of transaction queue 110 is obtained, MMU 104 is stalled, and therefore performance of MMU 104 degrades.

Accordingly, there is a need in the art to overcome the aforementioned drawbacks of conventional MMUs comprising a single translation table walker (e.g., TTW 114) capable of only servicing one translation table walk at a time and a transaction queue (e.g., transaction queue 110) capable of processing only one transaction at a time.

SUMMARY

Exemplary aspects relate to systems and methods for performing address translations in a multithreaded memory management unit (MMU). Two or more address translation requests can be received by the multithreaded MMU and processed in parallel to retrieve address translations if they are present in a translation cache of the multithreaded MMU or perform translation table walks in parallel for address translation requests which miss in the translation cache.

The exemplary multithreaded MMUs can be configured to perform translation and transaction reordering of multiple client requests in parallel. Therefore, concurrent multi-threaded translation can be performed for multiple client input transactions received by the exemplary multithreaded MMU. Exemplary multithreaded MMUs are also configured to perform transaction reordering which allows newly translated transactions to bypass older transactions that are waiting to be translated (e.g., avoiding the limitation of servicing only the transaction at the head of the transaction queue in conventional MMUs).

In some aspects, exemplary multithreaded MMUs are configured to perform "pre-filtering" of translation requests in order to avoid duplication of requests to multiple translation table walkers which are provided to assist the translation of multiple threads in parallel. In some aspects, "post-filtering" of translation results is also performed in order to avoid duplication of translation cache fills. In yet other aspects, exemplary techniques are employed to reduce bandwidth consumption of translation table walks, by reducing duplication or redundancy in translation table accesses for multiple requests.

Accordingly, an exemplary aspect is directed to an apparatus comprising a multithreaded memory management unit (MMU) configured to receive two or more address translation requests from one or more upstream devices. The multithreaded MMU is further configured to process at least two of the two or more address translation requests in parallel, to obtain corresponding translated addresses of a system memory.

Another exemplary aspect is directed to a method of performing address translation, the method comprising receiving two or more address translation requests, and performing two or more address translations for the two or more address translation requests in parallel for obtaining corresponding translated addresses of a system memory, in a multithreaded memory management unit (MMU).

Another exemplary aspect is directed to an apparatus comprising means for receiving two or more address translation requests, and means for performing two or more address translations for the two or more address translation requests, to obtaining corresponding translated addresses of a means for storing, in parallel.

Yet another exemplary aspect is directed to a non-transitory computer readable storage medium comprising code, which, when executed by a processor, causes the processor to perform operations for address translation, wherein the non-transitory computer readable storage medium comprises code for receiving two or more address translation requests, and code for performing two or more address translations for the two or more address translation requests, to obtaining corresponding translated addresses of a system memory, in parallel.

BRIEF DESCRIPTION OF THE DRAWINGS

The accompanying drawings are presented to aid in the description of aspects of the invention and are provided solely for illustration of the aspects and not limitation thereof.

DETAILED DESCRIPTION

Figure 1:
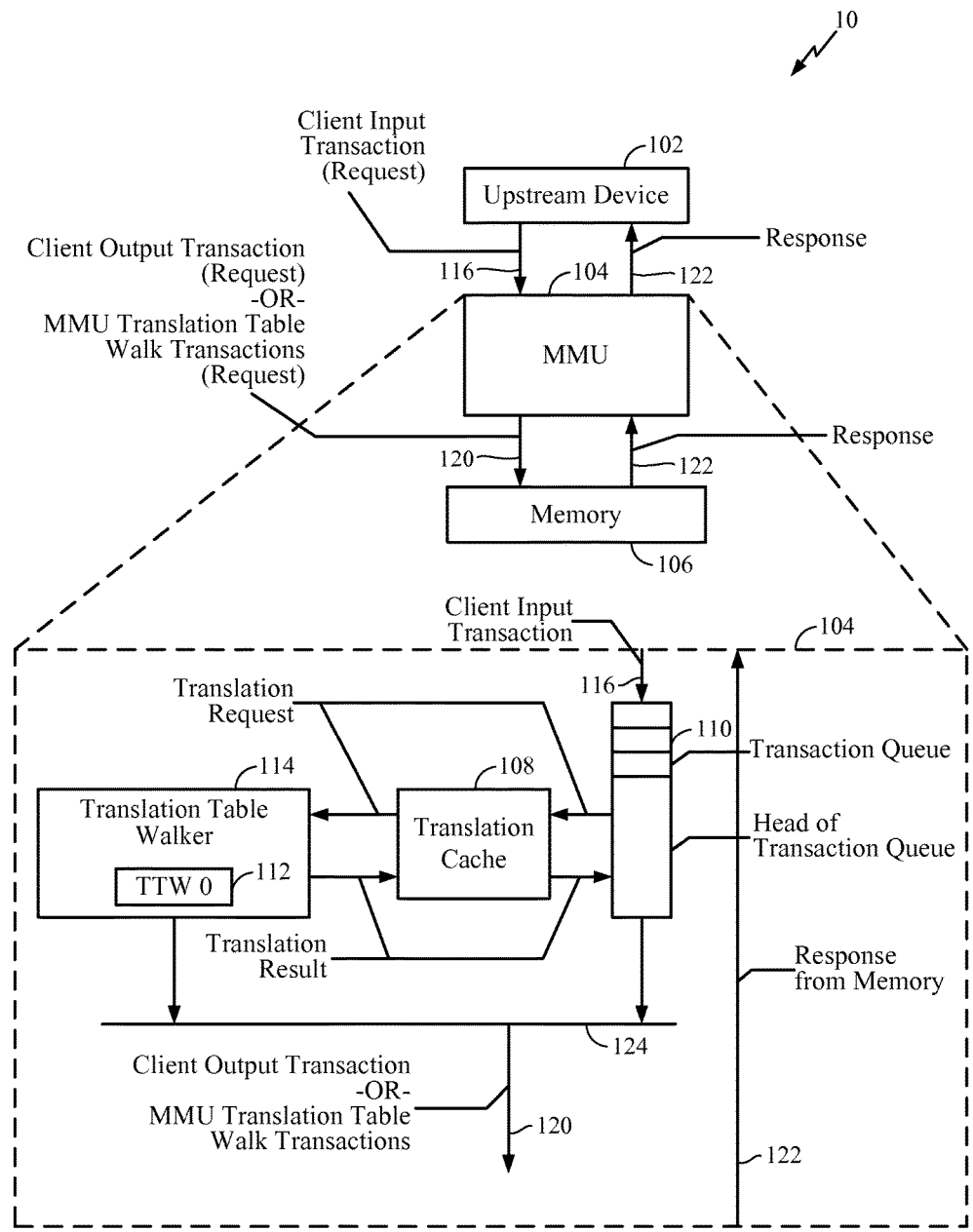
FIG. 1 illustrates a system comprising a conventional MMU.

Aspects of the invention are disclosed in the following description and related drawings directed to specific aspects of the invention. Alternate aspects may be devised without departing from the scope of the invention. Additionally, well-known elements of the invention will not be described in detail or will be omitted so as not to obscure the relevant details of the invention.

The word "exemplary" is used herein to mean "serving as an example, instance, or illustration." Any aspect described herein as "exemplary" is not necessarily to be construed as preferred or advantageous over other aspects. Likewise, the term "aspects of the invention" does not require that all aspects of the invention include the discussed feature, advantage or mode of operation.

The terminology used herein is for the purpose of describing particular aspects only and is not intended to be limiting of aspects of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the aspects described herein, the corresponding form of any such aspects may be described herein as, for example, "logic configured to" perform the described action.

Exemplary aspects of this disclosure pertain to multithreaded MMUs configured to perform translation and transaction reordering of two or more client requests in parallel. Therefore, concurrent multithreaded translations can be performed for multiple client input transactions received by the exemplary multithreaded MMU. Exemplary multithreaded MMUs can also perform transaction reordering which allows newly received transactions for translation requests to bypass older transactions that are waiting to be translated.

In some aspects, exemplary multithreaded MMUs can perform "pre-filtering" of translation requests in order to avoid duplication of requests to multiple translation table walkers provided to assist the translation of multiple threads in parallel. In some aspects, "post-filtering" of translation results may also be performed, to avoid duplication of translation cache fills. In yet other aspects, exemplary techniques may be employed to reduce bandwidth consumption of translation table walks, by reducing duplication or redundancy in translation table accesses for multiple requests.

Figure 2:
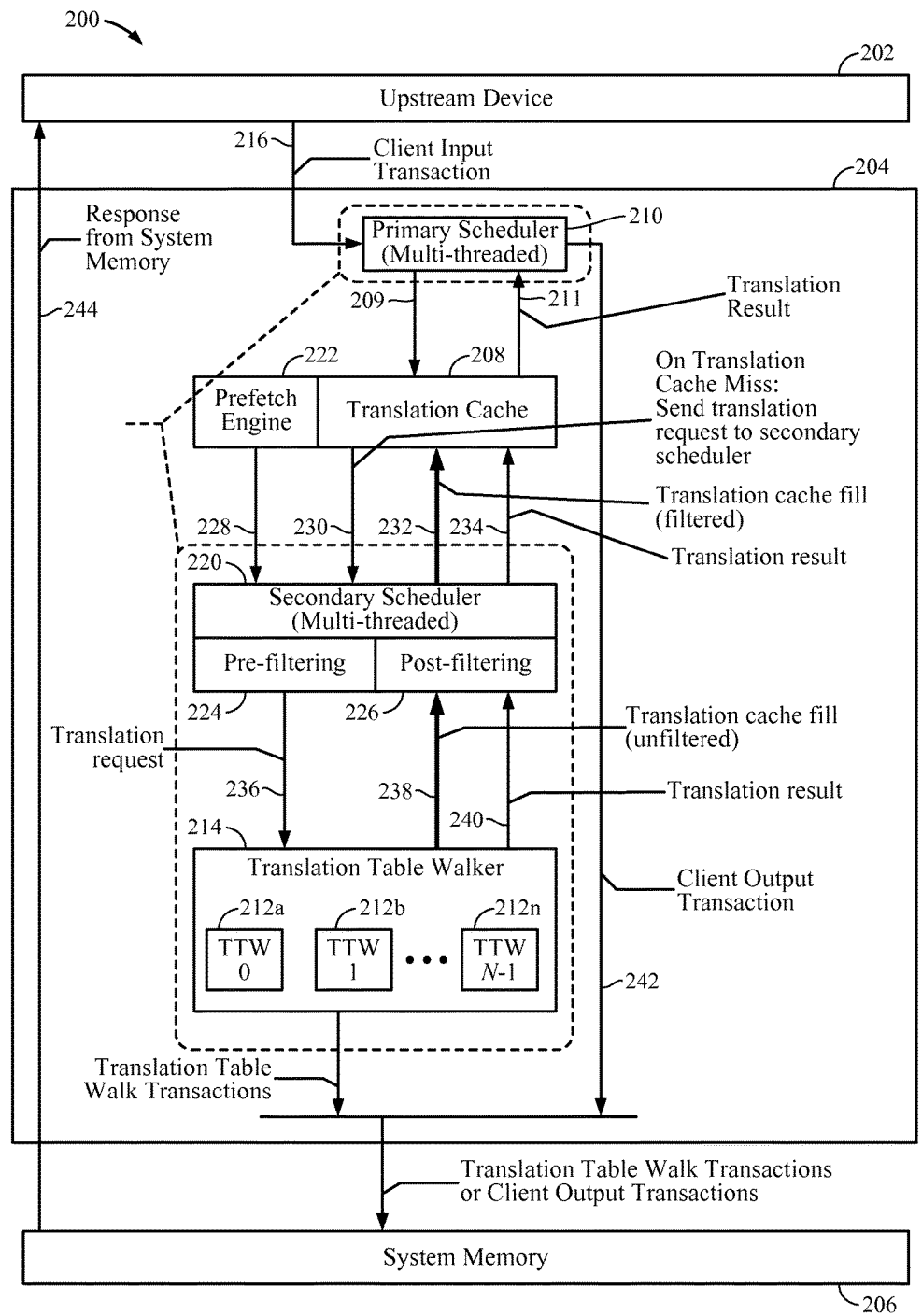
FIG. 2 illustrates an exemplary system comprising a multithreaded MMU.

With reference now to FIG. 2, processing system 200 is illustrated, which comprises MMU 204, configured as a multithreaded MMU according to exemplary aspects. In general, MMU 204 may receive client input transactions 216 from upstream device 202. As used herein, the term "transactions" can include requests to read/write system memory 206, and in some cases, also responses to the requests. For example, client input transaction 216 can include a request to read/write system memory 206, or address translation request for address translations to specified addresses of system memory 206. Upstream device 202 may not be a single device but may comprise one or more upstream devices including any general or special purpose processor such as a general processing unit (GPU), central processing unit (CPU), digital signal processor (DSP), etc. Moreover, in some cases, upstream device 202 may also comprise a multithreaded processor capable of processing two or more processing threads in parallel. As such, one or more upstream devices 202 can be configured to generate address translation requests to addresses of system memory 206, wherein the address translation requests may be received as client input transactions 216 by MMU 204.

To support multithreaded translation (i.e. concurrent processing of multiple transactions) and transaction reordering, exemplary aspects are directed to multithreaded MMUs which can include one or more multithreaded schedulers. As shown in FIG. 2, MMU 204 includes two schedulers, primary scheduler 210 (which can be multithreaded), and secondary scheduler 220 (which can also be multithreaded), which will be described in detail in the following sections.

Primary scheduler 210 receives client input transactions 216 and schedules translation requests in an order which can be the same as or different from the order in which client input transactions 216 are received. Primary scheduler 210 can issue multiple translation requests 209 to translation cache 208 for translation, before any one or more translation results 211 are received from translation cache 208. In this sense primary scheduler 210 can have multiple translation requests operating concurrently. Accordingly, primary scheduler 210 may be referred to as being "multithreaded" in this disclosure. Primary scheduler 210 can send client output transactions 242 (once they have been translated by translation cache 208) to the system memory 206, in an order which can be the same as or different from the order in which client input transactions 216 are received. Thus, primary scheduler 210 can be configured to issue two or more translation requests out of order to translation cache 208.

Secondary scheduler 220 receives translation requests 230 (e.g., which were sent to translation cache 208 from primary scheduler 210, but miss in translation cache 208), or translation requests 228 from prefetch engine 222. Prefetch engine 222 can be a separate processing module which is configured to prefetch transactions before a demand for them arises (e.g., if a loop is recognized in a program, then it may be known that there will be repeated requests which follow a predetermined pattern, and therefore, future requests can be fetched ahead of time in order to avoid any latencies which may be incurred in fetching them after a demand for them arises). Secondary scheduler 220 can issue translation requests 236 in an order which is the same as or different from the order in which translation requests 228, 230 were received. Secondary scheduler 220 can also issue multiple translation requests 236 before any one or more translation results 238, 240 are received. In this sense, secondary scheduler 220 can also have multiple translation requests operating concurrently, and therefore, is also be referred to as being "multithreaded" in some aspects of this disclosure.

In one aspect, secondary scheduler 220 is configured to schedule translation table walks for requests 230 which miss in translation cache 208 or requests 228 (or "prefetch address translation requests") from prefetch engine 222 (in an order which is the same as or different from the order of receipt) by sending requests 236 to translation table walker (TTW) 214. In this regard, secondary scheduler 220 includes pre-filter 224 and post-filter 226, whose functions will be briefly introduced below and explained in later sections.

It is possible that extraneous or redundant requests 236 can be made to TTW 214. Pre-filter 224 is configured to reduce extraneous or redundant requests 236 made to TTW 214. Post-filter 226, on the other hand, is configured to reduce extraneous or redundant translation cache fills or translation results 238, 240.

As also observed from FIG. 2, TTW 214 comprises two or more independent translation table walkers (TTW0-TTWn-1, designated as TTWs 212a-n, respectively). TTWs 212a-n can operate independently and concurrently to perform translation table walks for multiple requests 236 in parallel. Therefore, TTW 214 may also be referred to as being "multithreaded," in this disclosure.

Figures 3A, 3B:
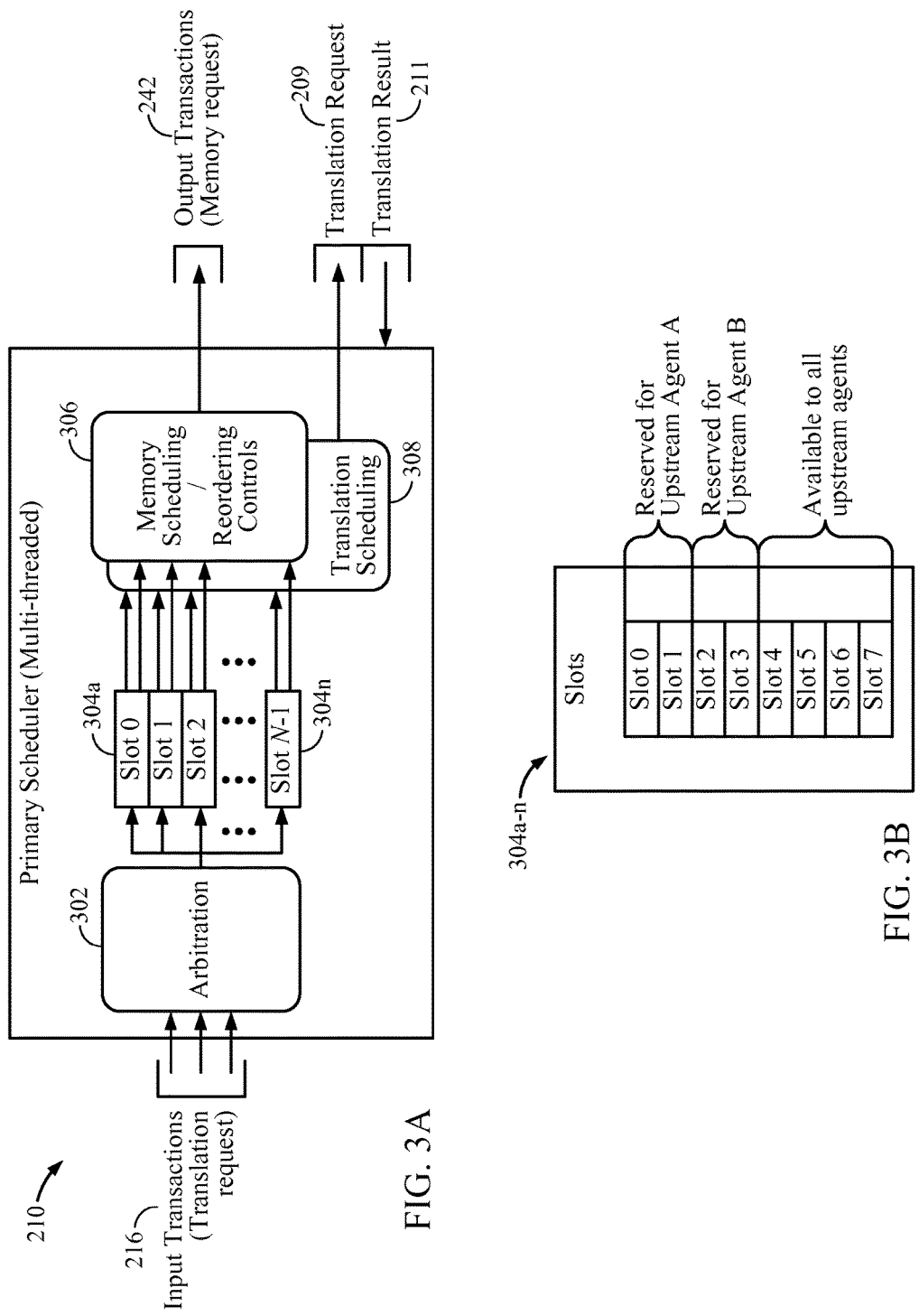
FIGS. 3A-B illustrate a primary scheduler of the multithreaded MMU of FIG. 2.

With reference now to FIG. 3A, an expanded view of primary scheduler 210 is illustrated. As shown, primary scheduler 210 can include one or more scheduler entries, which are referred to herein as primary scheduler slots. In FIG. 3A, N primary scheduler slots 0 to N−1 are shown, and designated as slots 304a-n. Slots 304a-n are shown and described in further detail with reference to FIG. 3B below. Client input transactions 216, described previously, are also shown as an input to primary scheduler 210. Each client input transaction 216 received by primary scheduler 210 can include address information, but it is possible that address translation may not be performed for some client input transactions 216. Translation results 211 received by primary scheduler 210 corresponding to translation requests 209 sent out by primary scheduler 210 are also shown. Primary scheduler 210 sends translation requests 209 for all client input transactions 216 for which address translation is requested, or specified, to a translation cache 208, from where translation requests 209 may be transferred to a secondary scheduler 220 (in case there is a miss in translation cache 208). Primary scheduler 210 outputs client output transactions 242 to memory 206, where output transactions 242 correspond to client input transactions 216 that have been processed by MMU 204. Accordingly, output transactions 242 correspond to either client input transactions 216 that have been translated, or client input transactions 216 for which address translation was not requested or performed.

With combined reference now to FIGS. 3A-B, as primary scheduler 210 receives one or more client input transactions 216, primary scheduler 210 is configured to store and operate on one or more on client input transactions 216 in parallel. In this regard, each client input transactions 216 is stored in a corresponding slot of one or more slots 304a-n while the corresponding address translations requests are processed, e.g., until a response is received for a translation request and the corresponding client input transactions 216 is subsequently removed from primary scheduler 210. In case it is determined that a translation will not be performed, then also the processing of a corresponding translation request will be treated as completed and the corresponding client input transaction 216 will be removed from primary scheduler 210. Slots 304a-n (e.g., corresponding to specifically illustrated slots 0-7 in FIG. 3B) can be allocated in a programmable manner (e.g., to different agents based on certain classifications of the agents) or may be allocated in a fixed manner to correspond to specific agents of upstream client device 202.

For example, upstream client device 202 may be composed of one or more agents (e.g., agents A, B, etc.), where a group of one or more requests may correspond to an agent. The agents may be classified in groups or classes. Each classification may be based on minimum and maximum limits for the amount of translation requests each group/class of agents can issue to primary scheduler 210. As seen in FIG. 3B, some slots may be reserved for specific agents (e.g., slots 0 and 1 for agent A, slots 2 and 3 for agent B) and some slots (e.g., slots 4-7) may be available for all agents. A particular agent of upstream client device 202 can have its translation requests processed by primary scheduler 210 when the following conditions are true: (1) the agent has a client input transaction 216 (e.g., a translation request) available to issue to MMU 204; (2) primary scheduler 210 has sufficient slots 304a-n free and available to satisfy the minimum allocation of slots 304a-n corresponding to all agents; and (3) primary scheduler 210 is currently servicing fewer than the maximum number of slots 304a-n allowed for the agent.

In order to enforce or implement the above conditions, arbitration unit 302 is provided in primary scheduler 210. In the event that multiple agents of client upstream device 202 meet the above three conditions at the same time, arbitration unit 302 is configured to implement arbitration policies to determine which agent's client input transaction 216 is accepted by primary scheduler 210 first. Several types of arbitration policies, such as, round robin or fixed priority (e.g., oldest client input transaction 216 is serviced first), programmable priority (e.g. requests from an agent A may be programmed to be of higher priority than requests from an agent B), or any other priority-based arbitration policy known in the art can be implemented by arbitration unit 302 in this regard.

After passing through arbitration unit 302, client input transactions 216 that are determined to be eligible for processing by primary scheduler 210 are queued or placed in available or empty slots 304a-n. Although not shown explicitly, each of the slots 304a-n may also have a state associated with it, wherein the state of a slot comprises a status of address translation for a client input transaction 216 stored in the slot. The following states may be associated with slots of schedulers in this disclosure, although it is not an exhaustive list, and variations/additions are possible: (1) "waiting for translation cache lookup" (e.g., when translation request 209 is to be scheduled, and addresses translation is performed); (2) "translation is progress" (e.g., when translation request 209 has been scheduled, and is now waiting for translation result 211); (3) "waiting for memory access since no translation is to be performed" (e.g., when client output transaction 242 does not specify that translation is to be performed, but is scheduled for memory access; (4) "translation completed" (e.g., when the corresponding translation result 211 has been received, at which point, translation is deemed to be complete and the transaction is scheduled for memory access as a client output transaction 242).

Accordingly, the state of the slot in which a client input transaction 216 is placed is updated to one of the following: "waiting for translation cache lookup" (if address translation is to be performed) or "waiting for memory access since no translation is to be performed" (if no address translation is to be performed).

Each client input transaction 216 received and stored in one of slots 304a-n in the above manner by primary scheduler 210 is eventually processed by MMU 204. If a client input transaction 216 is designated as one for which translation is to be performed, a corresponding translation request is scheduled using a scheduling algorithm. At this juncture, it will be understood that secondary scheduler 220 also has slots similar to slots 304a-n of primary scheduler 210, and the slots of secondary scheduler 220 will be explained in further detail in the following sections. With regard to scheduling a translation request, a translation request for a client input transaction 216 is issued to translation cache 208 or secondary scheduler 220 if an unallocated or empty slot available in secondary scheduler 220 and one or more slots 304a-n of primary scheduler 210 hold client input transactions 216 whose states are set to "waiting for translation cache lookup."

In the event that multiple client input transactions 216 in slots 304a-n have their states set as "waiting for translation cache lookup" the block depicted as memory translation scheduling 308 of primary scheduler 210 is configured to arbitrate among the multiple client input transactions 216, each stored in one of slots 304a-n, with the scheduling algorithm. The scheduling algorithm may include arbitration algorithms such as round robin or fixed priority (e.g., oldest client input transactions 216 scheduled first), programmable priority (e.g. priority based on the agents, or priority based signaling associated with the client input transactions 216), or other suitable priority-based selection mechanism known in the art.

When a client input transaction 216 is selected to be issued to translation cache 208 as translation request 209, the corresponding slot 304a-n of the client input transactions 216 is updated to "translation in progress." Translation cache 208 receives one or more translation requests 209 and a cache lookup is performed to check if translation cache 208 comprises corresponding translations. If there are one or more hits in translation cache 208, i.e., if corresponding translations exist in translation cache 208 for particular translation requests 209 (also referred to as "hitting address translation requests" in this disclosure), then translation cache 208 forwards translation results 211 to primary scheduler 210 and the state of the corresponding slots from which the particular translation requests 209 were sent, are updated to "translation completed." If, on the other hand, there are one or more misses, and no corresponding translations exist in translation cache 208 for one or more translation requests 209 (also referred to as "missing address translation requests" in this disclosure), secondary scheduler 220 is accessed to schedule corresponding one or more translation requests 236 to one or more of translation table walkers (TTWs) 212a-n of TTW 214 (see FIG. 2). When translation results 238/240 are received from TTW 214, the translation results are forwarded to primary scheduler 210 (through translation results 232/234 to translation cache 208 and thereon to primary scheduler through translation results 211).

When translation cache 208 or secondary scheduler 220, via TTW 214, completes the translation for a particular translation request 209 and translation result 211 is returned to primary scheduler 210, primary scheduler 210 processes translation results 211 by performing the following actions: (1) translation results 211 are stored in a corresponding slot 304a-n from which translation request 209 was issued; and (2) the state of the corresponding slot 304a-n is marked as "translation completed." In the event that multiple translation results 211 are available simultaneously, primary scheduler 210 is configured to select which translation result 211 is to be received first for processing. In this regard, TTW 214 is configured to arbitrate among translation results 211 based on algorithms such as round robin or fixed priority (oldest translation result 211 is processed first), programmable priority, or other priority-based selection mechanism known in the art.

Accordingly, primary scheduler 210 may receive translation results 211 out of order (OOO), which can be processed using the arbitration schemes discussed above. For all slots 304a-n whose status indicates that processing is "completed" (including slots for which translation is not requested/performed) a scheduling algorithm is employed to determine which completed transaction 242 is issued to system memory 206. In this regard, the scheduling algorithm is designed to ensure that ordering rules are followed, and any client input transactions 216 in slots 304a-n that would create an ordering hazard are not eligible for being scheduled to system memory 206. Exemplary reordering rules to avoid hazards are explained in the following sections. The scheduling algorithm may be designed to select the highest priority output transaction 242 that is determined to be eligible to be issued to system memory 206. Priority for output transactions 242 may be associated with each client input transactions 216, or priority (e.g., based on quality of service (QoS) metrics) associated with the type of agent (also referred to as a "master" of the client upstream device 202) which issued the client input transactions 216. Issuing output transactions 242 to system memory 206 further involves removing the corresponding client input transaction 216 from primary scheduler 210, i.e., the corresponding client input transaction 216 is de-allocated from its corresponding slot 304a-n.

Applicable reordering rules for avoiding reordering hazards will now be described. If system memory 206 is a weakly ordered memory, in order to avoid reordering hazards, primary scheduler 210 is configured to ensure that (1) reordering any two output transactions 242 shall not create a read-after-write (RAW) hazard; (2) reordering any two output transactions 242 shall not create a write-after-write (WAW) hazard; and (3) reordering any two output transactions 242 shall not create a write-after-read (WAR) hazard, as RAW, WAW, and WAR hazards are known in the art.

On the other hand, if system memory 206 is a strongly or strictly ordered memory, in order to avoid reordering hazards, primary scheduler 210 is configured to ensure that reordering any two output transactions 242 shall not create a strict ordering hazard. If the two output transactions 242 originate from the client input transactions 216 generated by the same agent and the two output transactions 242 are designated for strict ordering, the output transactions 242 cannot be re-ordered.

In some cases, the following additional reordering rules may also be applicable. In this regard, primary scheduler must ensure that reordering does not create the following hazards: (1) reordering any two output transactions 242 shall not create an in-order hazard. If the two output transactions 242 originate from the client input transactions 216 generated by the same agent and the agent is only capable of receiving responses 244 in the same order the two output transactions 242 are issued, the agent is deemed to be "in-order response is specified" and the two output transactions 242 (both marked "in-order") cannot be reordered if no response reorder buffers (as known in the art) are implemented. If response reorder buffers are implemented, the two output transactions 242 mentioned above can be reordered and the response reorder buffers are configured to reconstruct the original order such that the "in-order response is specified" agent receives responses 244 back in an expected order.

Figure 4A:
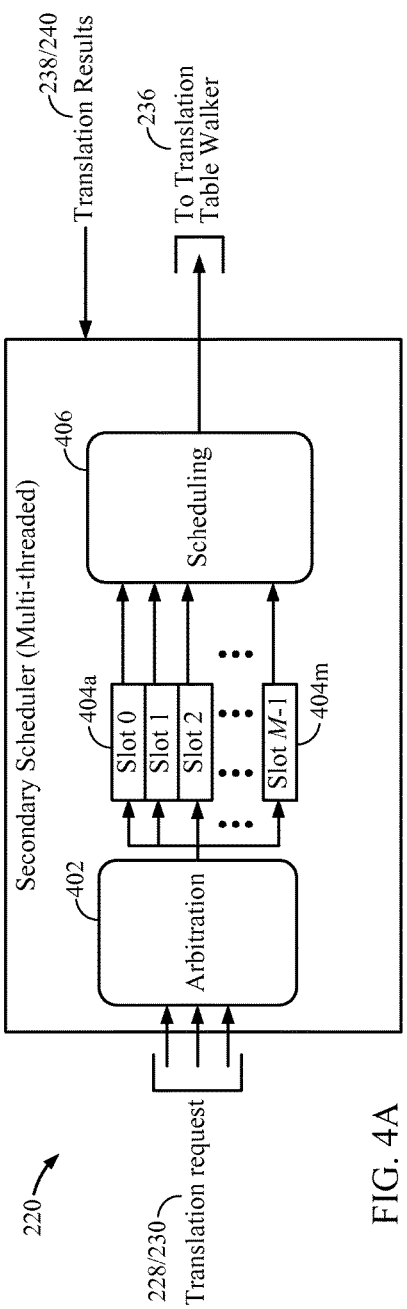
FIGS. 4A-B illustrate a secondary scheduler of the multithreaded MMU of FIG. 2.
Figure 4B:
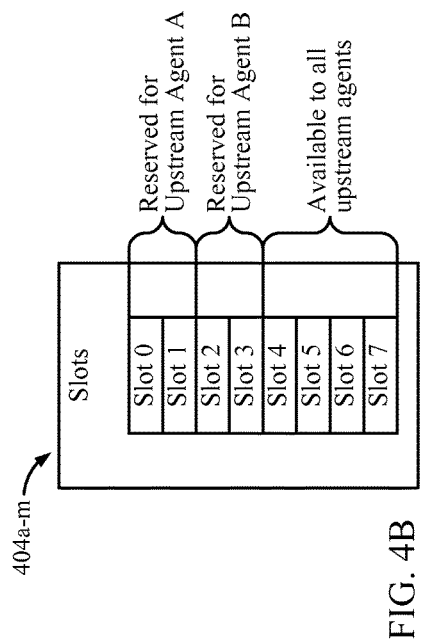

With reference now to FIGS. 4A-B, secondary scheduler 220 will be explained in detail. Referring back to FIG. 2, when translation requests 228/230 are received from prefetch engine 222 or translation cache 208, respectively, secondary scheduler is also configured to store and operate on one or more (e.g., M) translation requests 228/230 in parallel. Similar to slots 304a-n of primary scheduler 210, translation requests 228/230 received by secondary scheduler 220 are stored in one or more of M secondary scheduler slots shown as slots 0-M-1 and designated as slots 404a-m, until translation results 238/240 are received from TTW 214.

Slots 404a-m can be allocated in a programmable or fixed manner to agents based on different classifications of agents from which client input transactions 216 originated (as previously discussed). Once again, each classification can be based on minimum/maximum limits of the amount of translation requests from each group/class of agents can be issued to the secondary scheduler 220. An agent is eligible to have its translation requests 228/230 processed by secondary scheduler 220 when the following conditions are met: (1) the agent has a translation request 228/230 available; (2) secondary scheduler 220 has enough available slots 404a-m to satisfy the minimum slot allocation for all agents; and (3) secondary scheduler 220 is currently servicing fewer than the maximum number of slots 404a-m allowed for the requesting agent. As such it is seen from FIG. 4B that some slots may be reserved for certain agents (e.g., slots 0 and 1 for agent A, slots 2 and 3 for agent B) and some slots (e.g., slots 4-7) may be available for all agents.

In the event that multiple agents meet the above conditions simultaneously, arbitration block 402 is configured to implement an arbitration policy to determine which translation request 228/230 is processed first. The arbitration policy may be round robin or fixed priority (e.g., oldest translation request 228/230 is processed first), programmable priority (e.g. translation requests 230 from client input transactions 216 are prioritized over translation requests 228 from prefetch engine 222), or other priority-based arbitration policy known in the art.

Upon receiving translation requests 228/230 and selecting translation requests 228/230 by arbitration block 402, translation requests 228/230 are assigned to corresponding slots 404a-m and the states of the slots (not shown) are marked "waiting for translation" (if translation requests 228/230 are not eligible for pre-filtering, as will be discussed in the following sections with reference to pre-filtering block 224 of FIG. 2) or "waiting for X" (if translation requests 228/230 are eligible for pre-filtering, and where X corresponds to a slot of a previous translation request 236).

Each translation request 228/230 received and stored in slots 404a-m is eventually issued to one of TTWs 212a-n of TTW 214 (each TTW 212a-n is configured to service one translation table walk at a time). A translation request 228/230 is issued to a TTW 212a-n if an unallocated TTW 212a-n is available to receive a translation request 228/230 and one or more slots 404a-m hold translation requests 228/230 whose states are "waiting for translation."

In the event that more than one translation request 228/230 stored in slots 404a-m have the state "waiting for translation," scheduling block 406 is configured to arbitrate among them based on a scheduling algorithm such as round robin or fixed priority (e.g., oldest translation request 228/230 is scheduled first), programmable priority (e.g. priority based on the agent from which translation request 228/230 originated), or other priority-based selection mechanism known in the art.

When a translation request 228/230 is scheduled to be issued to one of TTWs 212a-n, the state of the slot 404a-m which holds the translation request 228/230 is updated to "translation in progress." The corresponding TTW 212a-n will perform one or more of the following actions to processes the translation requests 228/230: (1) consult secondary translation caches (not shown); (2) perform translation table walks to complete the translation; (3) return results from the TTW 212a-n to translation caches (e.g., translation cache 208) which are capable of storing either complete or partial translations; or (4) return results from the TTW 212a-n to secondary scheduler 220.

When secondary scheduler 220 receives translation results 238/240 from TTWs 212a-n, secondary scheduler 220 processes the translation results 238/240 in slots 404a-m and marks the corresponding slot as "translation completed." In the event that more than one translation results 238/240 are returned simultaneously, TTW 214 selects which result is processed first, based, for example, on algorithms such as round robin or fixed priority (e.g., oldest translation results 238/240 processed first), programmable priority (e.g. priority based on the agent from which translation requests 228/230 originated), or other priority-based selection mechanisms known in the art.

Translation results 238/240 received by secondary scheduler are returned or de-queued in the following manner. Slots 404a-m whose statuses are marked as "translation completed" are selected and translation results 238/240 contained therein are returned to primary scheduler 210 (via translation cache 208). For slots 404a-n comprising translation results 238/240 corresponding to prefetch requests (translation requests 228), no further action is taken because output transaction 242 is not generated for prefetch requests, and so the slot 404a-m can be de-allocated (freed).

Translation results 238/240 from all slots 404a-m whose statuses are "translation completed" may be sent through an arbitration process if more than one is ready to be returned simultaneously. The arbitration process can include round robin or fixed priority (e.g., oldest translation result 238/240 returned first), programmable priority (e.g. priority based on the agent from which corresponding translation request 230 originated), or other priority-based selection mechanism known in the art. Once a translation result 238/240 is returned to the agent from which translation request 230 originated, the corresponding slot 404a-m is de-allocated (freed).

As noted above, two or more TTWs 212a-n can operate concurrently. Each TTW 212a-n can perform the necessary translation cache lookups, and memory accesses (translation table walks) to translate an address for translation request 236 received. Each TTW 212a-n can issue cache fill requests and forward translation results 238/240 to secondary scheduler 220. Secondary scheduler 220 can arbitrate and forward translation results 238/240, as necessary, to the appropriate destination.

Referring back to FIG. 2, pre-filtering block 224 will now be explained in further detail. Secondary scheduler 220 is configured to perform pre-filtering so that redundancy involved in the process of translating of multiple translation requests 236 in parallel is minimized From the above discussions it is seen that the process of translating of multiple translation requests 236 (i.e., missing address translation requests) includes memory accesses (e.g., to system memory 206) for translation table walks, translation cache lookups, allocation of resources such as TTWs 212a-n to process translation requests 236, etc.

When multiple translation requests 236 request translation for the same translation granule size of a given address space, for example (e.g., a 4 KB granule size, which may be the minimum translation granule size for an exemplary MMU 204) pre-filtering block 224 is configured to filter out, suppress, or avoid duplication of all but a reduced number (e.g., one) of the similar missing address translation requests and forward only one of the reduced number (e.g., one) of the multiple translation requests 236 to TTWs 212a-n for processing. Pre-filtering block 224 can then use translation results 238/240 of the one translation or "initial" translation for one or more subsequent translation requests 236. To determine which requests are similar, pre-filtering block 224 checks translation requests 228/230 received at secondary scheduler 220, respectively from prefetch engine 222 or from primary scheduler 210 (which miss in translation cache 208). The address (and other information to identify the operating environment/address space) related to translation requests 230 is determined and compared with addresses of all other translation requests 236 currently being serviced by secondary scheduler 220 (i.e., whose statuses are "translation in progress" or "waiting for translation" in their corresponding slots 404a-m). A match or similar request is found if the input addresses fall within the same translation granule (e.g., a same 4 KB block), and all other information identifying the operating environment/address space is identical.

If a match is found, the status of a slot 404a-m comprising a newly received translation request 236 is marked as "waiting for X" instead of "waiting for translation," where X is the slot 404a-m comprising the matching translation request 236. When a TTW 212a-n returns translation result 238/240 for slot X, the slot 404a-m whose status is "waiting for X" is updated with translation result 238/240 and its status is updated to "completed translation." In alternative aspects, instead of updating the slot 404a-m whose status is "waiting for X," translation cache lookup (or processing by TTW 212a-n) for the "waiting for X" slot can be deferred until translation result 238/240 for slot X has been updated.

In some aspects, pre-filtering block 224 can implement a "window" based processing. In window based processing, when TTWs 212a-n process translation requests 236, in addition to fetching the table or page mapping for the minimum translation granule of address space being accessed, an aligned window of adjacent table or page mappings are also fetched. If concurrent translation requests 236 request translation for addresses covered by this window, pre-filtering block 224 can be configured to ensure that a translation table walk is only performed once, and each subsequent translation request 236 waits for the window of table or page mappings to be returned on translation results 238/240.

In some other aspects, a miss-under-miss pre-filtering of the minimum translation granule size (e.g. 4 KB translation block) can be employed. Miss-under-miss pre-filtering is similar in many aspects to the above-described window based processing. Notably, the difference in miss-under-miss processing is as follows. Subsequent translation requests 236 (e.g., for virtual addresses returned from TTWs 212a-n in the case of virtual to physical address translation to be performed by MMU 204) are considered to be the same or have a match with an initial translation request 236 if the addresses for the initial and subsequent translation requests 236 fall within the same aligned window (e.g., a multiple of a minimum translation granule such as a 4 KB, rather than being restricted to the minimum translation granule window size of 4 KB).

With reference again to FIG. 2, post-filtering block 226 will now be explained in further detail. Since multithreaded TTW 214 can process multiple translations simultaneously, it is possible that concurrent translation results 238/240 may fill translation cache 208 with redundant/duplicate information. Miss-under-miss post-filtering may be employed by post-filtering block 226 in order to eliminate (or minimize) the amount of duplicate information that is written to translation cache 208. Post-filtering block 226 may receive one or more translation results 238/240 from the one or more TTWs 212a-n, and if two or more of the one or more translation results 238/240 are similar translation results, forward only one of the similar translation results to translation cache 208, while suppressing remaining similar translation results.

Accordingly, in one aspect of post-filtering, post-filtering block 226 is configured to probe or lookup translation cache 208 before filling translation cache 208, in order to ensure that no duplicate information will be filled in translation cache 208. However, bandwidth of translation cache 208 lookup (which could potentially be used to process other translations requests 209 from primary scheduler 210, for example) may be affected by the lookup performed by post-filtering block 226. For example, when a translation cache fill request (e.g., translation result 238/240) from TTWs 212a-n is received at secondary scheduler 220, post-filtering block 226 may probe translation cache 208 to check if a translation corresponding to translation result 238/240 already exists in translation cache 208. If the probe returns a match, post-filtering block 226 can discard translation result 238/240 received from TTWs 212a-n. Otherwise, post-filtering block 226 can allow translation cache 208 to be filled with translation result 238/240.

In another aspect of post-filtering, a separate cache (not shown) of recently filled translation results 238/240 can be maintained. This separate cache is referred to herein as a "recently filled cache" which holds recently filled translation results 238/240. The recently filled cache can be consulted to check for duplicate translation results 238 before a new translation result 232/234 is eventually filled in translation cache 208. The recently filled cache can be smaller than translation cache 208, e.g., the number of entries of the recently filled cache can be proportional to the number of translation requests 236 that can be processed concurrently by TTWs 212a-n. While it may still be possible to fill duplicate information in translation cache 208 when the recently filled cache is used in this manner, there is little to no effect on bandwidth of translation cache 208 lookup, since additional translation cache probe is not performed.

In one aspect of utilizing the recently filled cache for post-filtering, when an unfiltered translation result (e.g., translation result 238 which has not been post-filtered) is received at post-filtering block 226, the recently filled cache is consulted or probed. If the probe returns a match for a particular translation result 238, post-filtering block 226 may discard the matching translation result 238 and prevent the matching translation result 238 from filling translation cache 208 (since it is assumed herein that if the matching translation result 238 was received in response to a translation request 236 recently issued, there is a high probability the matching translation result 238 is still resident in translation cache 208). If the probe does not result in a match, post-filtering block 226 issues the translation result 238 to fill translation cache 208 as well as the recently filled cache.

In some aspects, the post-filtering based on the recently filled cache may be configured in the following manner. When an unfiltered translation result (e.g., translation result 238) is received by secondary scheduler 220, each slot 404a-m of secondary scheduler 220 is checked to see if there is a match with translation result 238. As previously described, slots 404a-m may comprise the translation request 230 (e.g., a virtual address), and context information associated with the translation request 230. For a translation result 238 which matches a pending translation request 230 in any of slots 404a-m that have a pending translation request, the state of the slot 404a-m which comprises the matching translation request 230 is marked as "translation cache fill discard." If a subsequent translation result 238 also matches translation request 230 of the slot whose state is "translation cache fill discard," this subsequent translation result 238 is determined to be a duplicate, and is discarded by post-filtering block 226, rather than allowing the subsequent (duplicate) translation result 238 to fill translation cache 208. Translation results 238 corresponding to translation request 230 stored in any slot 404a-m whose state is not marked "translation cache fill discard" will not be discarded, but allowed to fill translation cache 208 (e.g., via translation cache fill (filtered) result 232 shown in FIG. 2). Determining whether a translation result 238 corresponds to or matches translation requests 230 stored in any of slots 404a-m can involve any matching/lookup mechanism known in the art to match an address field and context information (e.g., virtual machine identifier, address space identifier, etc.) and may be similar to a process of searching translation cache 208.

Figure 5:
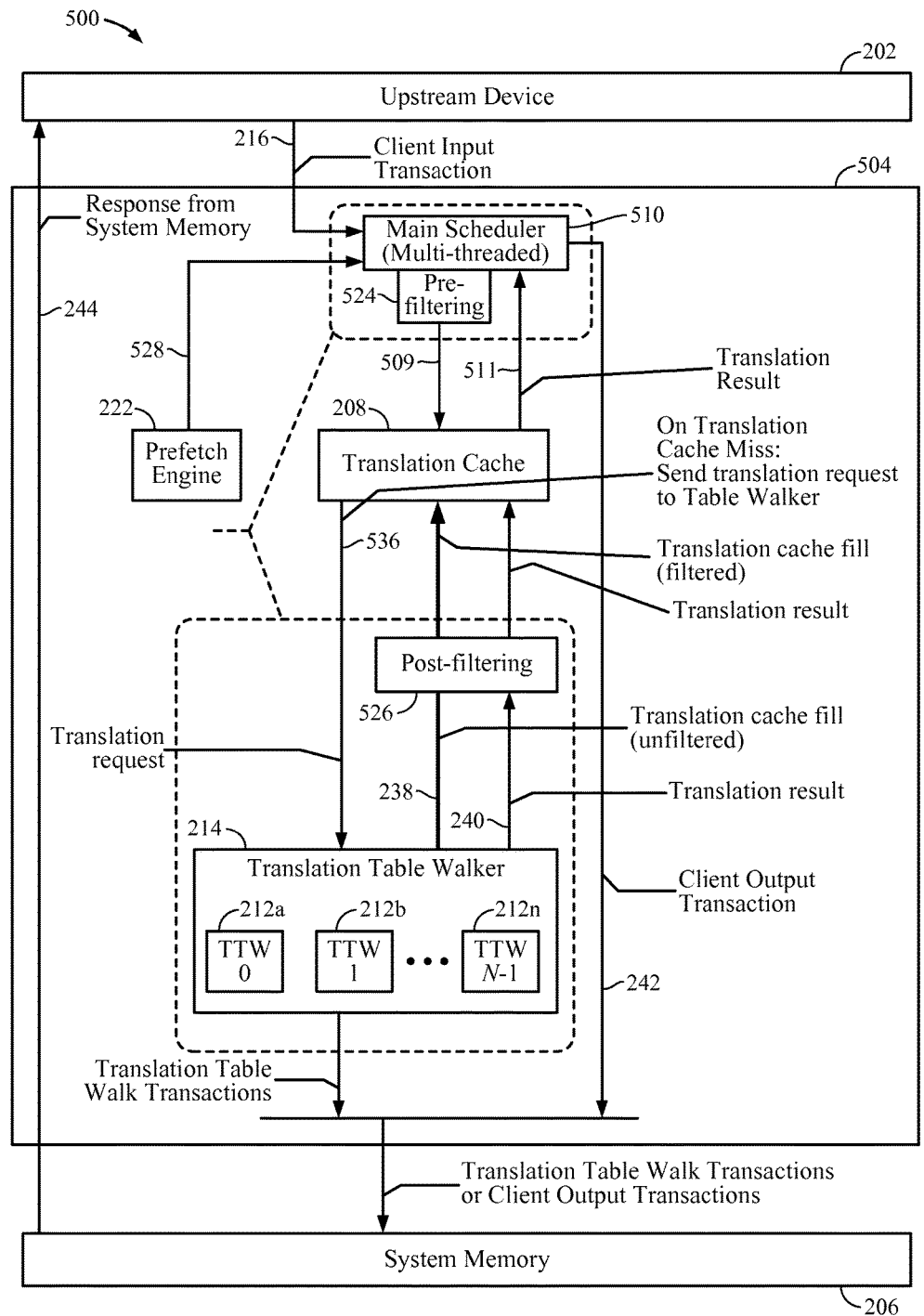
FIG. 5 illustrates another exemplary system comprising a multithreaded MMU.

With reference now to FIG. 5, an alternative implementation of an exemplary multithreaded MMU is shown. FIG. 5 illustrates processing system 500 comprising MMU 504. Processing system 500 is similar in many aspects to processing system 200 of FIG. 2 and therefore like reference numerals have been maintained to designate similar features of these two processing systems. Focusing on significant differences between processing systems 200 and 500 without a repetition of similar features, it is seen from FIG. 5 that MMU 504 replaces primary scheduler 210 and secondary scheduler 220 of MMU 204 with a single, main scheduler 510, which is configured to perform functions of both primary scheduler 210 and secondary scheduler 220. MMU 504 also has pre-filtering block 524 to perform pre-filtering of translation requests 509 sent to translation cache 208. Post-filtering block 526 performs post-filtering functions of translation results 238/240 before translation results 238/240 are filled in translation cache 208. Prefetch engine 222 sends requests 528 (or "prefetch address translation requests" in this disclosure) directly to main scheduler 510, to which pre-filtering can also be applied by pre-filtering block 524. Translation results 511 (from translation cache 208 or from translation results 238/240 provided by TTW 214 comprising TTWs 212a-n for translation requests 536 missing in translation cache 208) are directly provided to main scheduler 510. The remaining processes and functions of MMU 504 are similar to those of MMU 204 and therefore a further detailed discussion of these will be avoided herein.

Figure 6:
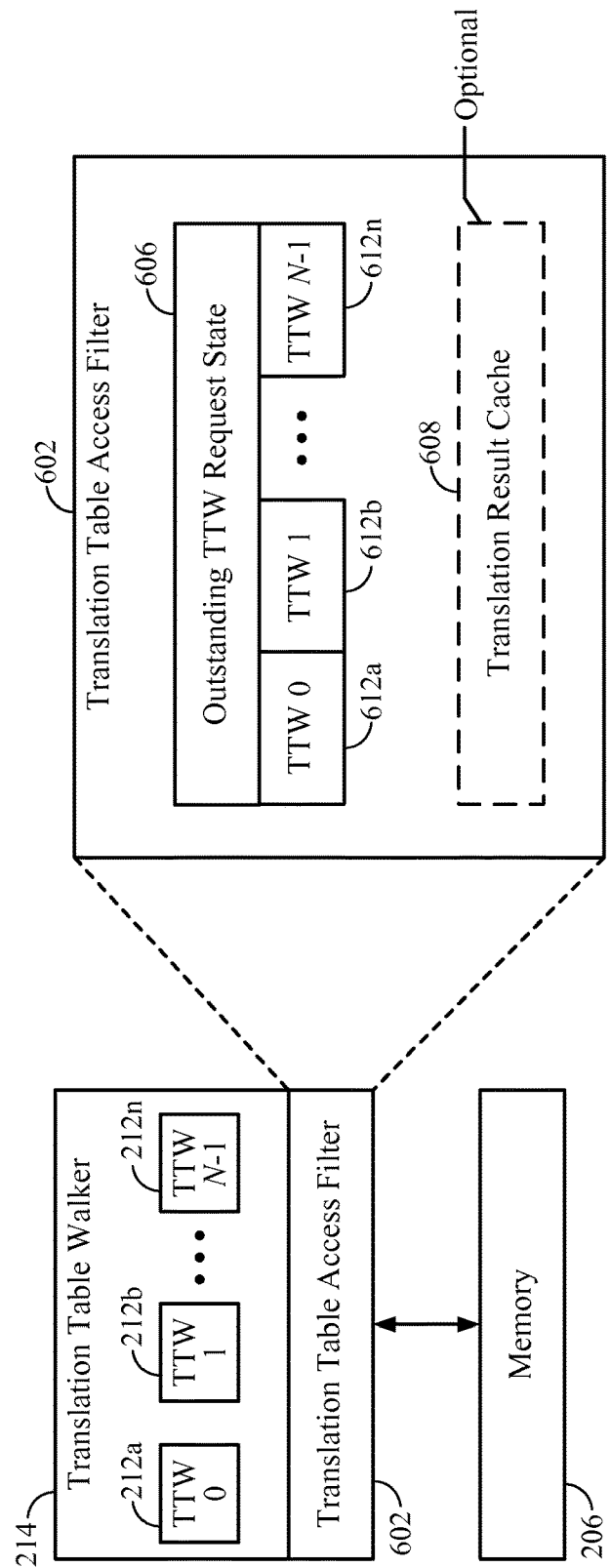
FIGS. 6-7 illustrate aspects related to a translation table access filter.

With reference now to FIG. 6, aspects pertaining to reduction of access to translation tables will be described. Since exemplary multithreaded MMUs (e.g., 204/504) can perform multiple translation table walks concurrently, if state machines employed for these concurrent translation table walks are not coordinated, the state machines (e.g., TTWs 212a-n) may duplicate work and collectively issue translation table memory requests to the same translation table address more than once. Accordingly, some aspects pertain to eliminating duplicate/redundant memory accesses, correspondingly reducing access to the translation table walkers and access bandwidths of the multithreaded MMUs. In this regard, FIG. 6 shows the previously described TTWs 212a-n of TTW 214, and additionally, translation table access filter 602 configured to reduce translation table walk bandwidth by reducing/eliminating the duplicate translation table walk requests/accesses.

Translation table access filter 602 can be configured or placed in between TTWs 212a-n and memory 206. An exploded view of translation table access filter 602 is also shown in FIG. 6. Translation table access filter 602 comprises outstanding TTW request state block 606 configured to hold outstanding requests to TTW 214. Corresponding registers or storage means 612a-612n corresponding to TTWs 212a-n are provided to hold outstanding requests relating to particular TTWs 212a-n. An optional translation result cache 608 can also be provided in some aspects to store some translation results of translation table walks (i.e., translated addresses of memory 206). Using outstanding TTW request state 606 and registers 612a-612n, and optionally, translation result cache 608, translation table access filter 602 can detect duplicate/redundant accesses of memory 206 and reduce or eliminate the duplicate/redundant accesses, while allowing only unique accesses of memory 206.

Figure 7:
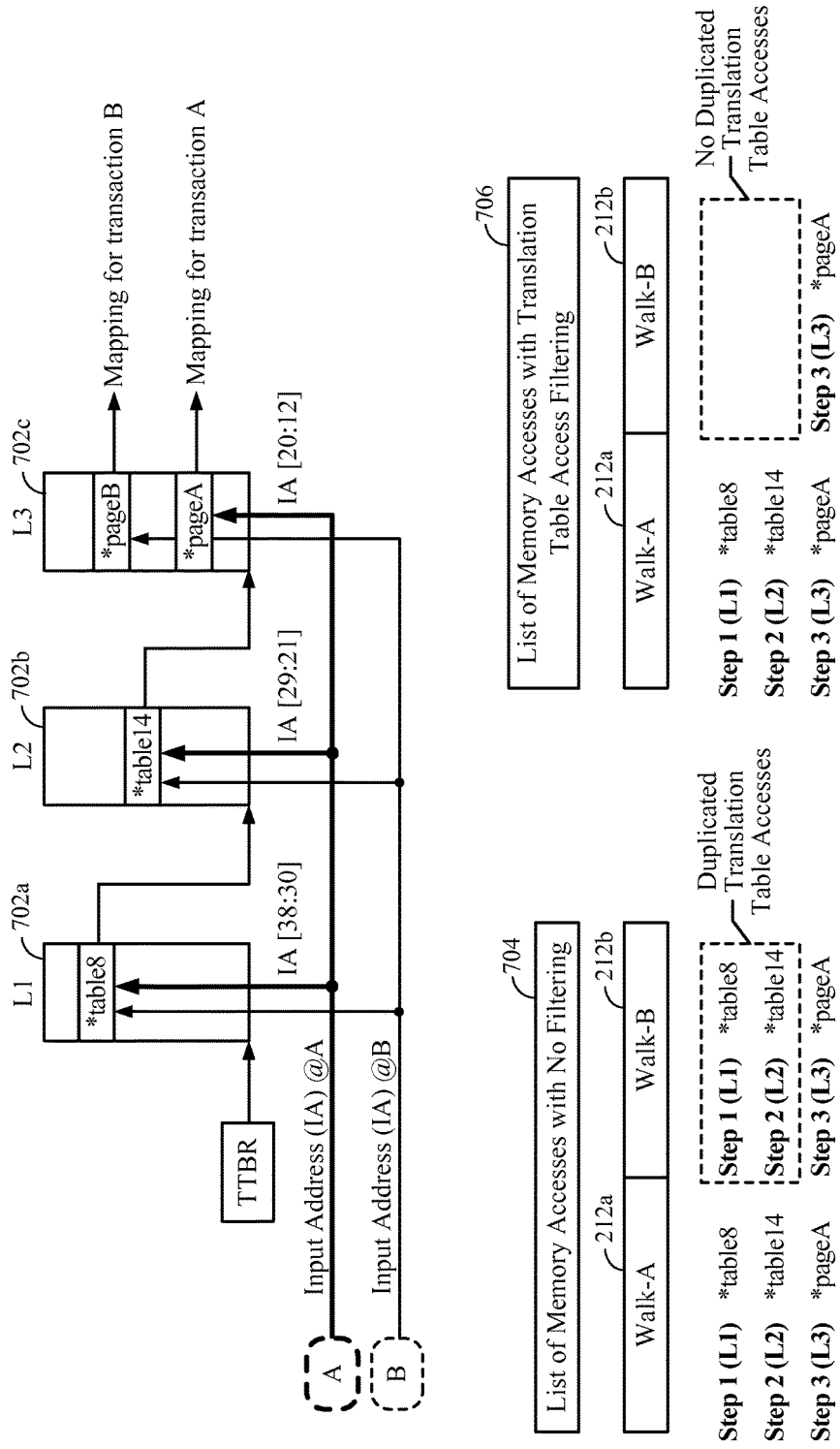

The effect of translation table access filter 602 in an exemplary multithreaded MMU (204/504) will be described with reference to FIG. 7. Two table walk sequences associated with two separate table walkers (e.g., TTWs 212a-b) are depicted as walk-A and walk-B in FIG. 7. In an example, TTWs 212a-b can concurrently perform translation table walks for addresses "A" and address "B" within the same address space, using the same translation table. If address "A" and address "B" reside in different translation granules (e.g., 4 KB blocks of virtual memory), but fall within the same block of memory (e.g., a 2 MB block of virtual memory) it is seen that TTWs 212a-b have common elements of the translation table walk for addresses "A" and address "B". This commonality leads to duplicate memory accesses to the same translation table entries in tables or pages L1 702*a* and L2 702*b*, as shown. Table 704 illustrates a list of memory accesses for table walks related to addresses "A" and "B" with no filtering (e.g., without using translation table access filter 602) and table 706 illustrates a list a list of memory accesses for table walks related to addresses "A" and "B" with filtering (e.g., with the use of translation table access filter 602). Comparing tables 704 and 706, it is seen that duplicate translation table accesses ("step 1 (L1) and step 2 (L2) for TTW 212*b* deployed in table walks for address "B") which exist in table 704 are eliminated in table 706. Thus, the number of accesses is reduced when translation table access filter 602 is deployed in exemplary aspects, which leads to reduced bandwidth.

Figure 8:
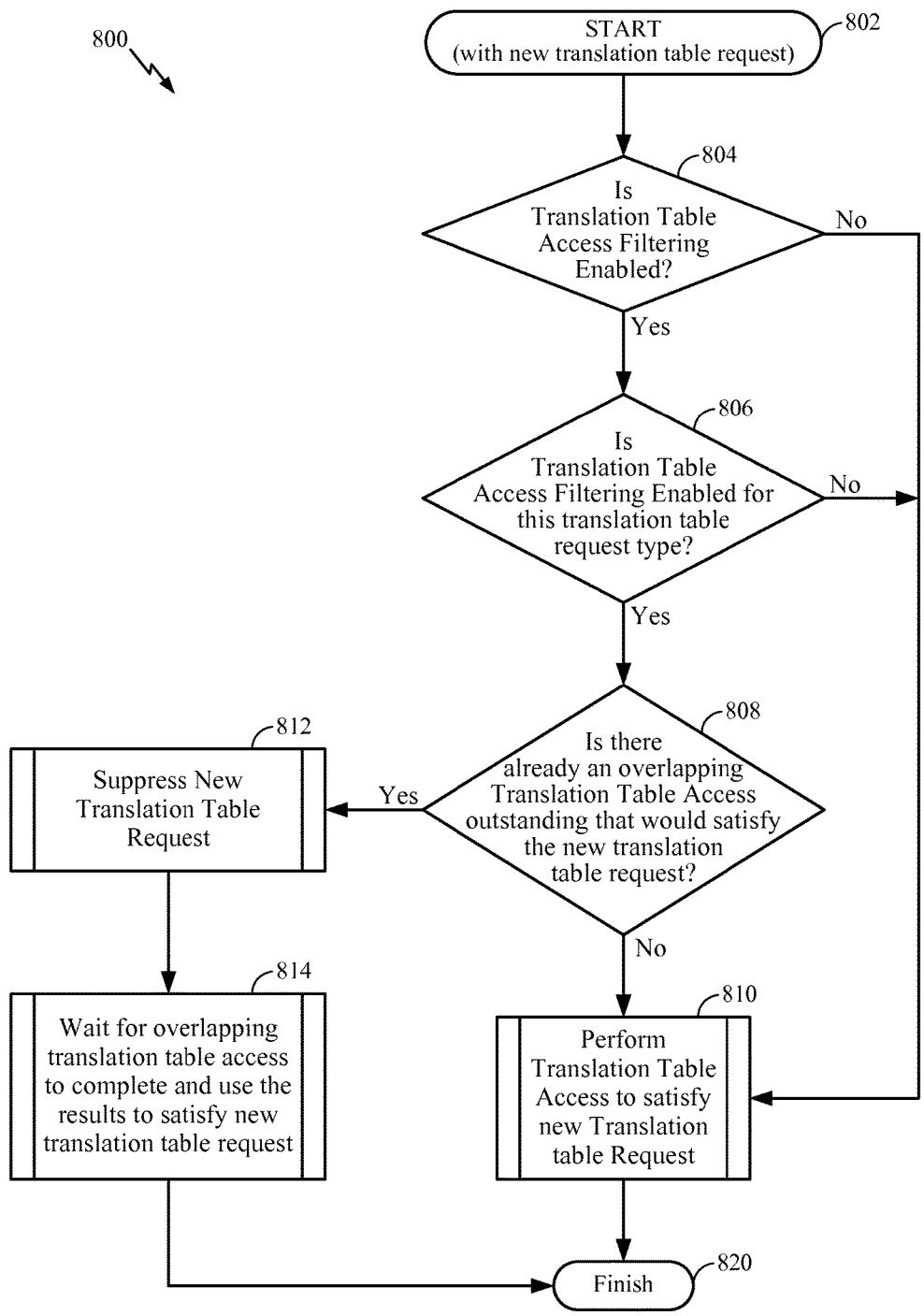
FIGS. 8-9 illustrate flow charts for methods of using a translation table access filter.

With reference now to FIG. 8, method 800 pertaining to an algorithm or flow chart for suppressing extraneous/redundant accesses to translation tables is illustrated. Method 800 can be selectively enabled. When method 800 is enabled, for each new translation request 236 received for any one of TTWs 212*a-n*, method 800 can be used to suppress extraneous/redundant accesses to memory 206. The enable can be a global enable for all types of accesses to MMU 204, for example, or individual enables can be applied for particular translation table access types. Some examples of translation table access types include stage-1, levels 1-3 and stage-2, levels 1-3.

Considering method 800 in further detail, in block 802, method 800 can start with each new translation request 236, for example. In block 804, it is determined whether translation table access filter 602, for example is enabled. If it is enabled ("yes" path), method 800 proceeds to block 806, where it is determined whether translation table access filter 602 is enabled for the particular request type. If in block 804, it is determined that translation table access filter 602 is not enabled, then method 800 proceeds to block 810. Similarly, in block 806, if it is determined that translation table access filter 602 is not enabled for the particular request type, then method 800 proceeds to block 810.

If in block 806, it is determined that translation table access filter 602 is enabled for the particular request type, method 800 proceeds to block 808, where it is checked whether there is already an overlapping translation table access outstanding that would satisfy the new translation table request (e.g., from outstanding TTW request state block 606 or registers 612*a-n* of FIG. 6). If in block 808, the determination is "no," method 800 proceeds to block 810. In block 810, translation table access (e.g., from TTW 214 to memory 206) is performed in order to satisfy the new translation request 236 which arrived at block 802. In block 808, if the determination is "yes," method 800 proceeds to block 812, where a new translation table request is suppressed for translation request 236 (e.g., using translation table access filer 602). Method 800 then proceeds to block 814 to wait for overlapping translation table access to complete in order to use their results to satisfy the new translation request 236. From blocks 814 and 810, method 800 proceeds to block 820, where method 800 finishes or ends.

In some aspects, block 820 may comprise storing page table data obtained from block 810, to satisfy the new translation request 236, to be stored in translation result cache 608. However, in some other aspects, additional filtering steps may be performed before deciding to store the page table data in in translation result cache 608. For example, following block 810, method 800 may involve additional filtering steps that can be performed before storing the page table data. The additional filtering steps will be explained with reference to FIG. 9 below.

Figure 9:
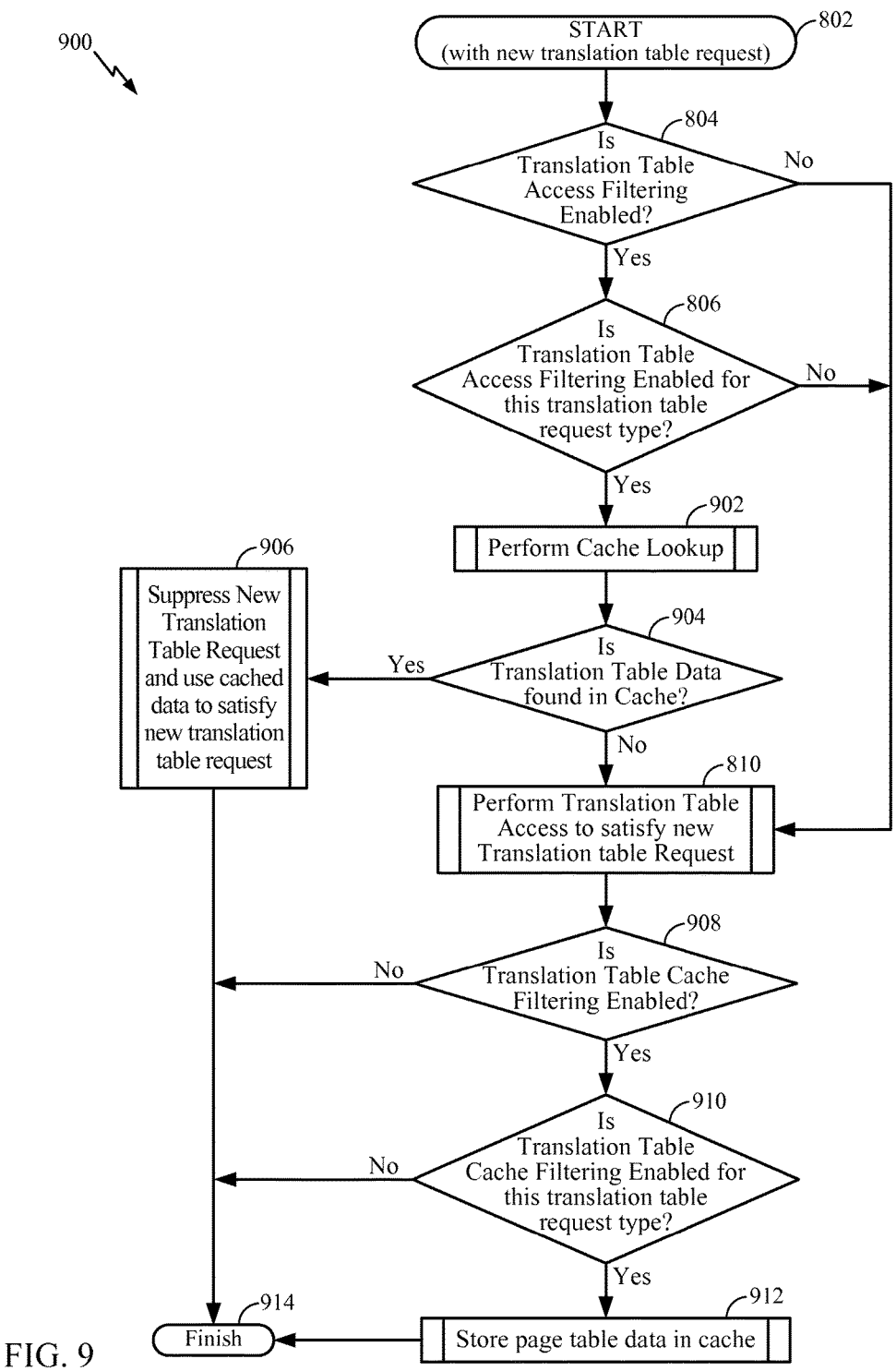

FIG. 9 illustrates another exemplary method 900 pertaining to an algorithm or flow chart for suppressing extraneous/redundant accesses to translation tables (e.g., TTW 214). Blocks 802, 804, 806, and 810 are similar to those of method 800 described above, and therefore they will not be described again. Starting with block 902, block 902 is reached if the determination in block 806 is "yes," where in block 902, optional translation result cache 608 is looked up. If requested translation table data for translation request 236 is found in translation result cache 608, in block 904, method 900 proceeds to block 906. In block 906, new translation table requests for translation request 236 are suppressed and data from translation result cache 608 is used to service translation request 236, and from there, method 900 proceeds to block 914 where method 900 is complete or finishes.

If, on the other hand, if translation data for translation request 236 is not found in translation result cache 608, in block 904, method 900 proceeds to block 810, from where additional steps in blocks 908-912 are performed. In block 908, it is once again determined if translation table access filter 602 is enabled and if not, method 900 ends in block 914. If translation table access filter 602 is enabled, in block 910 it is determined whether translation table access filter 602 is enabled for the particular translation table request type of translation request 236, and if not, method 900 ends in block 914. If in block 910 it is determined that translation table access filter 602 is enabled for the particular translation table request type of translation request 236, in block 912, page table data for the translation request 236 is stored in translation result cache 608 and method 900 ends in block 914.

In some exemplary aspects, since local caches (e.g., translation result cache 608) can hold translation table data, care is taken while responding to invalidation commands received by the exemplary MMUs (e.g., TLB invalidate commands, as known in the art). When any TLB invalidate command is received by MMU 204, for example, contents of the entire translation result cache 608 are considered to be invalid. Therefore, all translation table accesses that are currently outstanding to memory 206 are flagged, such that when their results return, they are not populated in translation result cache 608. In some cases, all entries in translation result cache 608 are correspondingly invalidated. The entire translation result cache 608 is invalidated in such cases on any such MMU invalidate command since the translation result cache 608 may be physically tagged. Other similar invalidation procedures can be implemented within the scope of this disclosure, as will be understood by one skilled in the art.

Figure 10:
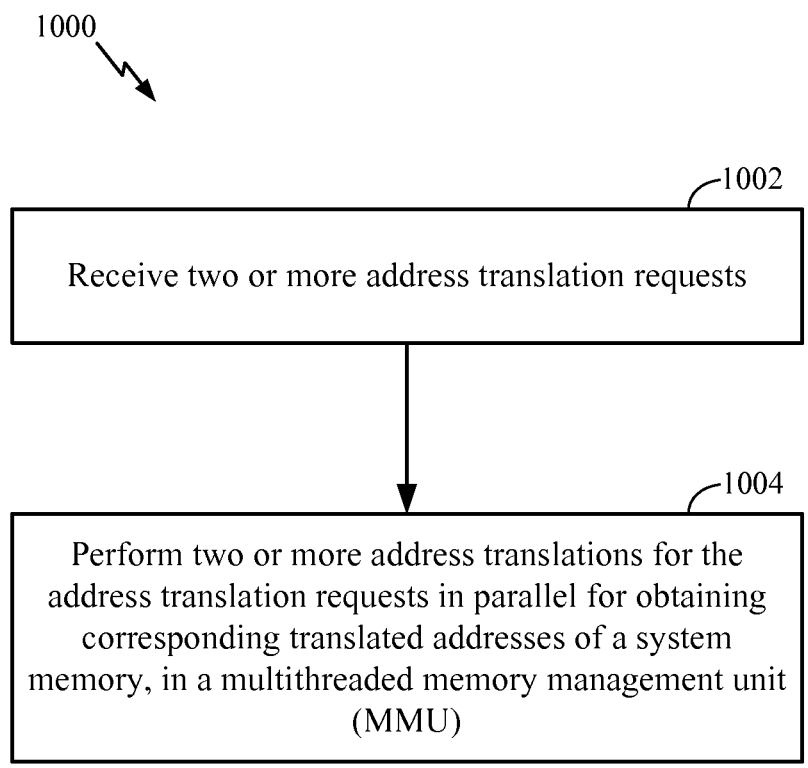
FIG. 10 is a flow chart of a method of processing translation requests using a multithreaded MMU.

It will be appreciated that aspects include various methods for performing the processes, functions and/or algorithms disclosed herein. For example, FIG. 10 illustrates a method 1000 of performing address translation. Method 1000 comprises receiving two or more address translation requests (e.g., client input transactions 216 from upstream client device 202); and performing two or more address translations for the two or more address translation requests in parallel for obtaining corresponding translated addresses of a system memory (e.g., memory 206), in a multithreaded memory management unit (e.g., MMU 204).

In some aspects, method 1000 can include storing the two or more address translation requests in at least one scheduler (e.g., in slots 304*a-n* of primary scheduler 210) and sending the two or more address translation requests (e.g., 209) to a translation cache (e.g., translation cache 208) in the multi-threaded MMU. In some aspects, the at least one scheduler (e.g., primary scheduler 210) can issue the two or more address translation requests to the translation cache in an order which is the same as or different from the order in which the two or more address translation requests were received by the at least one scheduler. In some aspects, method 1000 can also include receiving a translation (e.g., translation result 211) for an address translation request of the two or more address translation requests from the translation cache if there is a hit in the translation cache for the address translation request, or forwarding address translation requests which miss (e.g., 230) in the translation cache to a translation table walker (e.g., through secondary scheduler 220 to TTW 214). Two or more translation table walks can be performed by two or more translation table walkers (e.g., 212a-n) for two or more address translation requests in parallel.

In some aspects, method 1000 can include pre-filtering address translation requests (e.g., in pre-filtering block 224) which miss in the translation cache before forwarding the address translation requests to the translation table walker to avoid duplication of forwarding the address translation requests to the translation table walkers. In some aspects, method 1000 can also include post-filtering translation results (e.g., in post-filtering block 226) obtained from the translation table walker to avoid duplication of fills to the translation cache. In some aspects, method 1000 can also include reducing bandwidth consumption of translation table walks performed by the translation table walker, by reducing duplication or redundancy in accesses to a system memory (e.g., by using translation table access filter 602 in methods 800 or 900 as described above).

Figure 11:
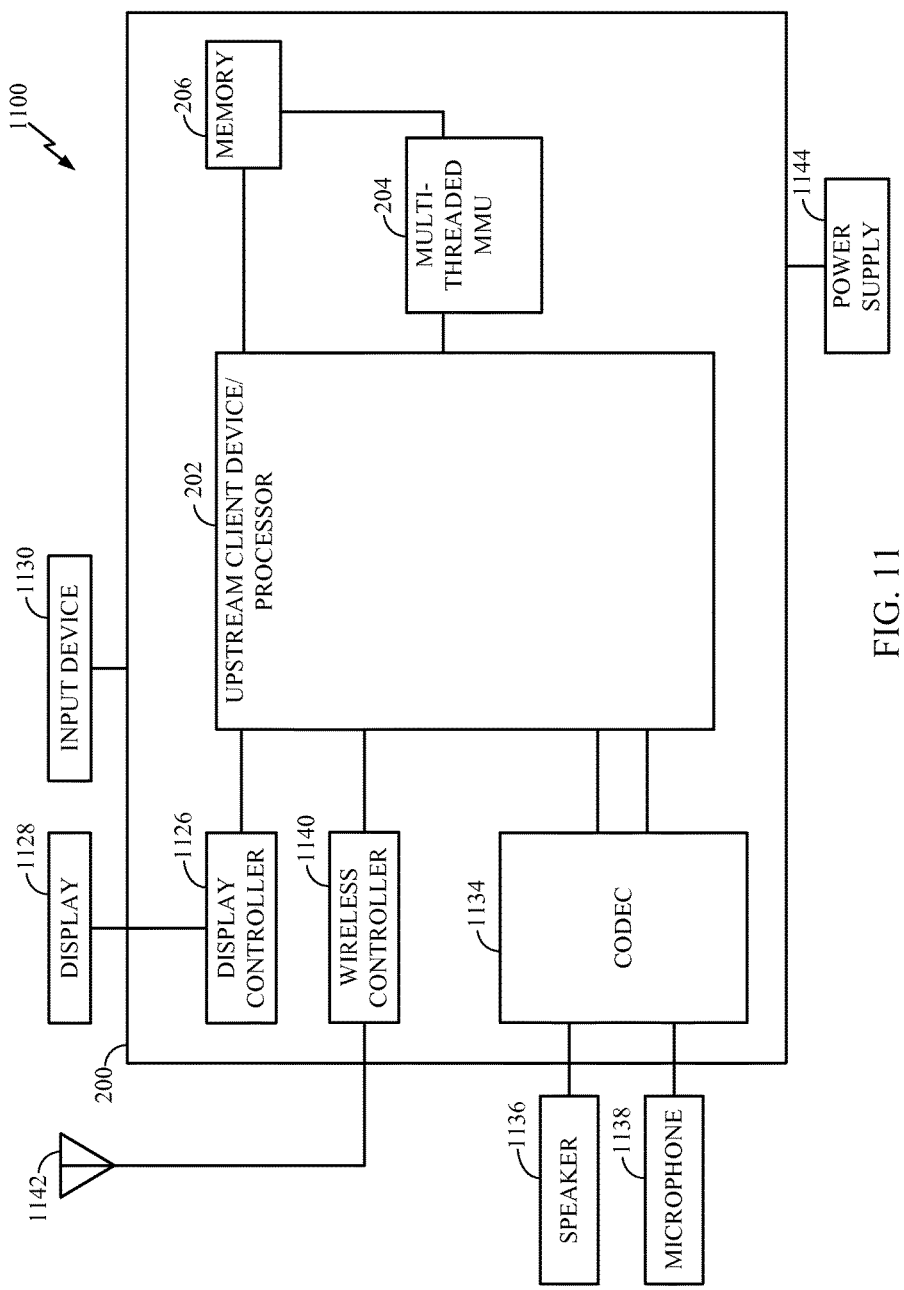
FIG. 11 illustrates an exemplary wireless device in which an aspect of the disclosure may be advantageously employed.

Referring now to FIG. 11, a block diagram of a wireless device that is configured according to exemplary aspects is depicted and generally designated 1100. Wireless device 1100 includes certain aspects of processing system 200 of FIG. 2, as will be explained below. Particularly illustrated is upstream client device 202, which may also be a processor (e.g., a digital signal processor (DSP), central processing unit (CPU), etc.,) coupled to multithreaded MMU 204 and to system memory 206. A direct connection to memory 206 from processor 202 is possible in some cases, in addition to the connection to memory 206 through MMU 204.

FIG. 11 also shows display controller 1126 that is coupled to processor 202 and to display 1128. Coder/decoder (CODEC) 1134 (e.g., an audio and/or voice CODEC) can be coupled to processor 202. Other components, such as wireless controller 1140 (which may include a modem) are also illustrated. Speaker 1136 and microphone 1138 can be coupled to CODEC 1134. FIG. 11 also indicates that wireless controller 1140 can be coupled to wireless antenna 1142. In a particular aspect, processor 202, display controller 1126, MMU 204, memory 206, CODEC 1134, and wireless controller 1140 are included in system 200 which can be integrated or packaged as a system-in-package or system-on-chip device.

In a particular aspect, input device 1130 and power supply 1144 are coupled to the system-on-chip device 200. Moreover, in a particular aspect, as illustrated in FIG. 11, display 1128, input device 1130, speaker 1136, microphone 1138, wireless antenna 1142, and power supply 1144 are external to the system-on-chip device 200. However, each of display 1128, input device 1130, speaker 1136, microphone 1138, wireless antenna 1142, and power supply 1144 can be coupled to a component of the system-on-chip device 200, such as an interface or a controller.

It should be noted that although FIG. 11 depicts a wireless communications device, processor 202, MMU 204, and memory 206 may also be integrated into a set-top box, a music player, a video player, an entertainment unit, a navigation device, a personal digital assistant (PDA), a fixed location data unit, a computer, a laptop, a tablet, a mobile phone, or other similar devices.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The methods, sequences and/or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, an aspect of the invention can include a computer readable media embodying a method for managing/scheduling threads of a multithreaded processor. Accordingly, the invention is not limited to illustrated examples and any means for performing the functionality described herein are included in aspects of the invention.

While the foregoing disclosure shows illustrative aspects of the invention, it should be noted that various changes and modifications could be made herein without departing from the scope of the invention as defined by the appended claims. The functions, steps and/or actions of the method claims in accordance with the aspects of the invention described herein need not be performed in any particular order. Furthermore, although elements of the invention may be described or claimed in the singular, the plural is contemplated unless limitation to the singular is explicitly stated.

What is claimed is:

1. An apparatus comprising:
   a multithreaded memory management unit (MMU) configured to receive two or more address translation requests from one or more upstream devices, wherein the multithreaded MMU is further configured to process at least two of the two or more address translation requests in parallel, to obtain corresponding translated addresses of a system memory, wherein the multithreaded MMU comprises a primary scheduler, a translation cache, and a secondary scheduler, wherein the primary scheduler is configured to receive the two or more address translation requests and issue the two or more address translation requests for translation in the translation cache, wherein if there are misses in the translation cache for one or more missing address translation requests issued by the primary scheduler, the translation cache is configured to forward the one or more missing address translation requests to the secondary scheduler, and wherein the secondary scheduler is configured to receive the one or more missing address translation requests and schedule the one or more missing address translation requests for translation to addresses of the system memory in one or more translation table walkers (TTWs); and wherein the multithreaded MMU further comprises at least one of:
 a pre-filtering block configured to receive the one or more missing address translation requests and if two or more missing address translation requests of the one or more missing address translation requests are similar missing address translation requests, forward only one of the two or more similar missing address translation requests to the one or more TTWs and suppress the remaining ones of the two or more similar missing address translation requests; or
 a translation table access filter configured to determine if two or more of the one or more missing address translation requests involve redundant accesses of the system memory, and allow only unique accesses of the system memory to be performed.

2. The apparatus of claim 1, wherein the one or more upstream devices comprise one or more of a general purpose processor, special purpose processor, or a multithreaded processor configured to generate the two or more address translation requests.

3. The apparatus of claim 1, wherein the primary scheduler is configured to issue the two or more address translation requests to the translation cache in an order which is different from the order in which the two or more address translation requests were received by the primary scheduler.

4. The apparatus of claim 1, wherein the primary scheduler comprises two or more primary scheduler slots configured to store the two or more address translation requests while the two or more address translation requests are processed.

5. The apparatus of claim 4, wherein the two or more primary scheduler slots are allocated to two or more agents of the one or more upstream devices.

6. The apparatus of claim 5, wherein the allocation is programmable based on classification of the two or more agents.

7. The apparatus of claim 5, wherein the allocation is based on an arbitration policy comprising round robin, fixed priority, or programmable priorities associated with the two or more agents.

8. The apparatus of claim 4, wherein the two or more primary scheduler slots comprise corresponding two or more states, wherein each state comprises a status of an address translation request stored in a corresponding primary scheduler slot.

9. The apparatus of claim 1, wherein if there are hits in the translation cache for one or more hitting address translation requests of the two or more address translation requests issued by the primary scheduler, the translation cache is configured to provide corresponding one or more translation results comprising one or more translated addresses of the system memory for the one or more hitting address translation requests, to the primary scheduler.

10. The apparatus of claim 9, wherein the primary scheduler is configured to schedule accesses to the one or more translated addresses of the system memory for one or more hitting address translation requests.

11. The apparatus of claim 10, wherein the primary scheduler is configured to schedule the accesses to the one or more translated addresses of the system memory based on priorities associated with corresponding one or more hitting address translation requests or quality of service (QoS) metrics associated with the one or more upstream devices which generated the one or more hitting address translation requests.

12. The apparatus of claim 11, wherein the primary scheduler is configured to schedule the accesses to the one or more translated addresses of the system memory based on reordering the accesses to avoid hazards between the accesses.

13. The apparatus of claim 1, wherein the secondary scheduler comprises two or more secondary scheduler slots configured to store two or more of the one or more missing address translation requests until translation results comprising translated addresses of the system memory corresponding to the two or more missing address translation requests are received from the one or more TTWs and the translated addresses are returned to the translation cache.

14. The apparatus of claim 13, wherein the two or more secondary scheduler slots are allocated to two or more agents of the one or more upstream devices.

15. The apparatus of claim 14, wherein the allocation is programmable based on classification of the two or more agents.

16. The apparatus of claim 13, wherein the two or more secondary scheduler slots comprise corresponding two or more states, wherein each state comprises a status of a missing address translation request stored in a corresponding secondary scheduler slot.

17. The apparatus of claim 14, wherein the allocation is based on an arbitration policy comprising round robin, fixed priority, or programmable priorities associated with the two or more agents.

18. The apparatus of claim 1, wherein the pre-filtering block is configured to determine that two or more missing address translation requests are similar missing address translation requests if input addresses to be translated for the two or more missing address translation requests fall within a same translation granule or a within a specified multiple of the same translation granule.

19. The apparatus of claim 1, further comprising a post-filtering block configured to receive one or more translation results from the one or more TTWs for the one or more missing address translation requests, and if two or more of the one or more translation results are similar translation results, forward only one of the similar translation results to the translation cache and suppress remaining similar translation results.

20. The apparatus of claim 19, wherein the post-filtering block is configured to probe the translation cache to determine if two or more of the one or more translation results are similar translation results.

21. The apparatus of claim 19, further comprising a recently filled cache configured to store the one or more translation results, wherein the post-filtering block is configured to probe the recently filled cache to determine if two or more of the one or more translation results are similar translation results.

22. The apparatus of claim 1, wherein the translation table access filter is configured to determine if two or more missing address translation requests involve redundant accesses if the translated addresses for the two or more missing address translation requests fall within a same block of memory.

23. The apparatus of claim 1, wherein the translation table access filter comprises a translation result cache configured to hold one or more translation results of the one or more missing address translation requests.

24. The apparatus of claim 23, wherein the translation table access filter is configured to provide the one or more translation results from the translation result cache for the one or more missing address translation requests.

25. A method of performing address translation, the method comprising:
receiving two or more address translation requests from one or more upstream devices; and
performing two or more address translations for the two or more address translation requests in parallel for obtaining corresponding translated addresses of a system memory, in a multithreaded memory management unit (MMU), comprising:
storing the two or more address translation requests in a primary scheduler of the multithreaded MMU and issuing the two or more address translation requests from the primary scheduler to a translation cache for translation;
forwarding one or more missing address translation requests which miss in the translation cache, to a secondary scheduler;
scheduling the one or more missing address translation requests received by the secondary scheduler for address translation in one or more translation table walkers (TTWs); and
at least one of:
determining if two or more missing address translation requests are similar missing address translation requests, and forwarding only one of the two or more similar missing address translation requests to the one or more TTWs while suppressing the remaining ones of the two or more similar missing address translation requests; or
determining if two or more of the one or more missing address translation requests scheduled for address translation in the one or more translation table walkers (TTWs) involve redundant accesses of the system memory, and allowing only unique accesses of the system memory to be performed.

26. The method of claim 25, comprising issuing the two or more address translation requests from the primary scheduler to the translation cache in an order which is different from the order in which the two or more address translation requests were received by the primary scheduler.

27. The method of claim 25, comprising storing the two or more address translation requests in two or more primary scheduler slots of the primary scheduler while the two or more address translation requests are being processed.

28. The method of claim 27, comprising allocating the two or more primary scheduler slots to two or more agents of the one or more upstream devices based on classification of the two or more agents or an arbitration policy comprising round robin, fixed priority, or programmable priorities associated with the two or more agents.

29. The method of claim 25, comprising, providing one or more translation results comprising one or more translated addresses of the system memory for one or more hitting address translation requests which hit in the translation cache, from the translation cache to the primary scheduler.

30. The method of claim 29, comprising scheduling accesses to the one or more translated addresses of the system memory, by the primary scheduler, based on priorities associated with corresponding one or more hitting address translation requests or quality of service (QoS) metrics associated with the one or more upstream devices which generated the one or more hitting address translation requests.

31. The method of claim 29, comprising reordering the accesses to the one or more translated addresses of the system memory, by the primary scheduler, for avoiding hazards between the accesses.

32. The method of claim 25, comprises storing two or more of the one or more missing address translation requests in two or more secondary scheduler slots until translation results comprising translated addresses of the system memory corresponding to the two or more missing address translation requests are received from the one or more TTWs and the translated addresses are returned to the translation cache.

33. The method of claim 32, comprising allocating the two or more secondary scheduler slots to two or more agents of the one or more upstream devices based on classification of the two or more agents or an arbitration policy comprising round robin, fixed priority, or programmable priorities associated with the two or more agents.

34. The method of claim 25, comprising determining that two or more missing address translation requests are similar missing address translation requests if input addresses to be translated for the two or more missing address translation requests fall within a same translation granule or a within a specified multiple of the same translation granule.

35. The method of claim 25, comprising probing the translation cache to determine if two or more of the one or more translation results are similar translation results.

36. The method of claim 25, comprising determining that two or more missing address translation requests involve redundant accesses if the translated addresses for the two or more missing address translation requests fall within a same block of memory.

37. The method of claim 25, further comprising holding one or more translation results of the one or more missing address translation requests in a translation result cache and providing the one or more translation results from the translation result cache for the one or more missing address translation requests.

38. A non-transitory computer readable storage medium comprising code, which, when executed by a processor, causes the processor to perform operations for address translation, wherein the non-transitory computer readable storage medium comprises:
code for receiving two or more address translation requests from one or more upstream devices; and code for performing two or more address translations for the two or more address translation requests, to obtain corresponding translated addresses of a system memory, in parallel, code for storing the two or more address translation requests in a primary scheduler and issuing the two or more address translation requests from the primary scheduler to a translation cache for translation;

code for forwarding one or more missing address translation requests which miss in the translation cache, to a secondary scheduler;

code for scheduling the one or more missing address translation requests received by the secondary scheduler for address translation in one or more translation table walkers (TTWs); and code for performing at least one of:
  determining if two or more missing address translation requests are similar missing address translation requests, and forwarding only one of the two or more similar missing address translation requests to the one or more TTWs while suppressing the remaining ones of the two or more similar missing address translation requests; or
  determining if two or more of the one or more missing address translation requests scheduled for address translation in the one or more translation table walkers (TTWs) involve redundant accesses of the system memory, and allowing only unique accesses of the system memory to be performed.

* * * * *